Nov. 24, 1936.  R. P. HEUER  2,062,005

SILICA BRICK AND METHOD OF MAKING THE SAME

Filed Aug. 11, 1934

Inventor
Russell Pearce Heuer

Witnesses:

Patented Nov. 24, 1936

2,062,005

UNITED STATES PATENT OFFICE 2,062,005

SILICA BRICK AND METHOD OF MAKING THE SAME

Russell Pearce Heuer, Bryn Mawr, Pa., assignor to General Refractories Company, a corporation of Pennsylvania Application August 11, 1934, Serial No. 739,490

15 Claims. (Cl. 25—156)

My invention relates to silica refractory brick produced from salvaged silica material, such as brick, which has been previously used in a furnace construction, and to the processes of making the same.

A purpose of my invention is to make an extremely economical silica brick specially suited to checkers and checker walls, and having a desirable moderately high crushing strength and density.

A further purpose is to produce a silica refractory brick of second quality which is sufficiently good for service in cooler portions of a metallurgical furnace, such as the regenerative checkers, checker chamber walls, exit flue walls, downtake and the backing up of the furnace side walls of an open hearth steel furnace, using as the chief ingredient material desirably removed from first quality uses in an open hearth steel furnace, a coke oven, or the like.

A further purpose is to grind salvaged silica brick which has been used in a furnace construction to produce larger and smaller silica particles, preferably free from substantial quantities of furnace dust and slag, to combine the salvaged silica particles in the proportions of between 40% and 65% of larger particles between 6 and 30 mesh per linear inch (5.6 and 139 mesh per square centimeter) and between 60% and 35% of smaller particles capable of passing through 50 mesh per linear inch (387 mesh per square centimeter), to moisten the mix with a water solution of sodium silicate in quantity suitable to introduce not more than 1.5% of sodium oxide ($Na_2O$), and preferably about 0.5% of sodium oxide ($Na_2O$), into the dried brick, to form the mix into brick under pressure exceeding 1000 pounds per square inch (70.3 kilograms per square centimeter), and preferably exceeding 5000 pounds per square inch (351.5 kilograms per square centimeter), to dry the brick at a temperature sufficient to remove the moisture and to employ the brick in second quality furnace uses in unburned condition.

A further purpose is to introduce not more than 25% of raw quartz such as pure silica sand into the mix for making silica brick to replace part of the salvaged silica material which has been used in a furnace construction.

A further purpose is to introduce into a brick mix not more than 40% of calcined silica to replace a portion of the salvaged silica material which has been removed from a furnace, using at least 60% of salvaged silica material in the brick. The bond may be included in the 60% or in the 40%.

A further purpose is to employ up to 5% of silicious bonding clay in addition to sodium silicate as a bond for silica brick made from salvaged silica material which has been used in a furnace construction.

A further purpose is to use up to 5% of finely divided iron ore as a bond, in addition to sodium silicate, in silica brick produced from salvaged silica brick taken from a furnace during repairing or rebuilding.

Further purposes appear in the specification and in the claims.

My invention relates to the processes of making the brick and to the brick produced.

The drawing is merely illustrative of the desirable uses to which the brick of my invention may be put.

Similar numerals indicate like parts.

Figure 1:
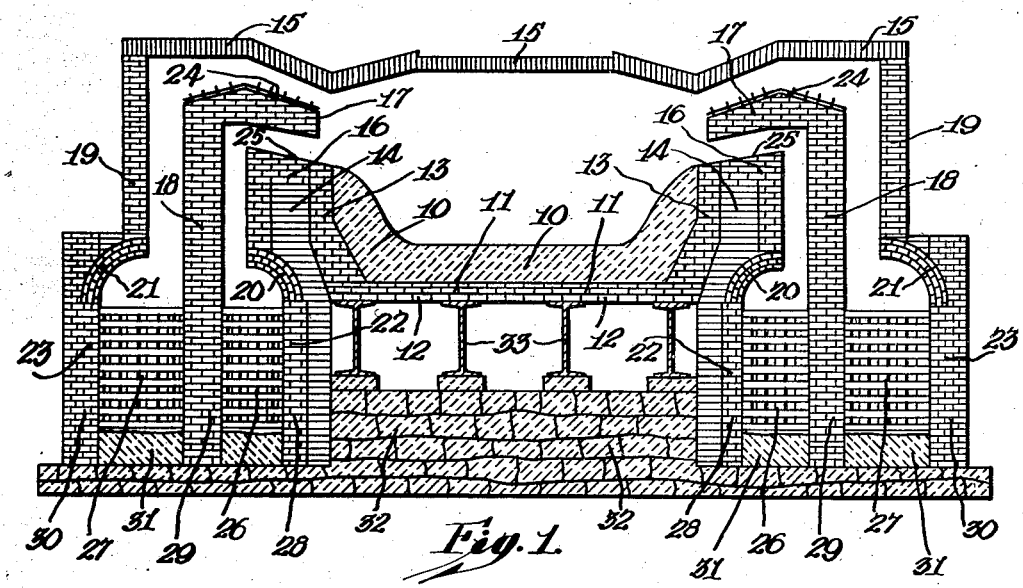
Figure 1 is a diagrammatic section of a typical open hearth steel furnace to which my invention has been applied.

In the modern metallurgical furnace, a number of different types of brick are employed, depending upon the chemical properties, density, refractoriness and load-carrying qualities necessary at the particular place. The effort is, of course, to use the cheapest material which will give satisfactory service at a given point. As an example, the open hearth steel furnace shown in Figure 1 may have a magnesia lining 10, supported on magnesia brick at 11, which are backed up by chrome brick at 12. The side walls likewise will comprise magnesia brick at 13, upon a basis of fireclay brick 14.

The furnace roof 15 comprises silica brick which, according to my invention as well as according to the prior art, must be of first quality, as this is an extremely vulnerable part of the furnace. The portion of the bridge wall at 16, the overhang of the checker partition wall at 17, the checker partition wall at 18, the exit flue walls at 19, the checker arches at 20 and 21 and the upper parts of the checker walls 22 and 23 have in the prior art been generally made of first quality silica brick, protected at the surface in certain vulnerable places, as at 24 and 25, by chrome brick.

The checkers themselves, at 26 and 27 and the lower parts of the checker chamber walls 28, 29 and 30 are conventionally made of fireclay brick, as they are subjected to lower temperatures than the higher portions of the exit flues. The checkers rest upon loam at 31, and the entire furnace is supported upon a masonry base 32, with steel at 33.

A large steel mill may use many million checker brick alone in a year, as the checkers become fouled with dust after a few campaigns of the furnace. I have discovered that a checker brick comparing favorably with the present fireclay brick may be made from salvaged first quality silica brick obtained from the roof 15, the portion of the bridge wall 16, the overhang of the checker partition wall 17, the checker partition wall 18, the exit flue walls 19, etc., when the furnace is rebuilt at the end of a campaign. The silica brick employed in the checker partition wall 18, the exit flue walls 19, the checker arches 20 and 21, and the upper parts of the checker walls 22 and 23 may desirably be the second quality brick of my invention, as these points are not subjected to the high temperatures or to the very high loads which necessitate the use of first quality brick. Likewise, the checkers 26 and 27 and the lower parts 28, 29 and 30 of the checker walls, which were formerly made of fireclay brick, may very desirably be made of my second quality silica brick.

The second quality silica brick of my invention may be produced at or very near the steel mill or other point of use, from salvaged first quality silica brick which have been removed from furnaces in the steel mill, without shipping any appreciable amount of material, by a very simple process involving but a small plant, little labor and no burning. While it is true that the brick produced in accordance with my invention will be distinctly inferior to first quality silica brick as produced in accordance with my Patents Nos. 1,969,750 and 1,969,751, granted August 14, 1934, the second quality silica brick of my invention is sufficiently satisfactory for the purpose which it is to serve, and is so much cheaper, even than second quality fireclay brick, that there is little inducement to employ either first quality silica brick or fireclay brick at the points of the furnace which are subjected to mild temperatures and moderate loads.

Part of the reason for the inferiority of my second quality silica brick to first quality silica brick is, of course, that the silica used in my brick is contaminated to some extent with slag, furnace dust and with the bond used in the original brick. Another reason is that the heat treatment of the material used in my brick is not nearly so satisfactory as that taught in my Patents Nos. 1,969,750, and 1,969,751.

I find that, in accordance with my invention, I may obtain a silica brick from salvaged silica brick removed from a furnace construction, which has a cold crushing strength exceeding 1000 pounds per square inch (70.3 kilograms per square centimeter), which has a bulk density of at least 0.95 ounces per cubic inch (1.64 grams per cubic centimeter) of brick volume, and usually at least 1 ounce per cubic inch (1.73 grams per cubic centimeter), and which is capable of withstanding temperatures of 1630–1685° C. These properties are not so greatly inferior to those of silica brick made from raw (not heat treated) quartz, without use of the features of the invention disclosed in my Patents Nos. 1,969,750 and 1,969,751, above referred to.

Figure 2:
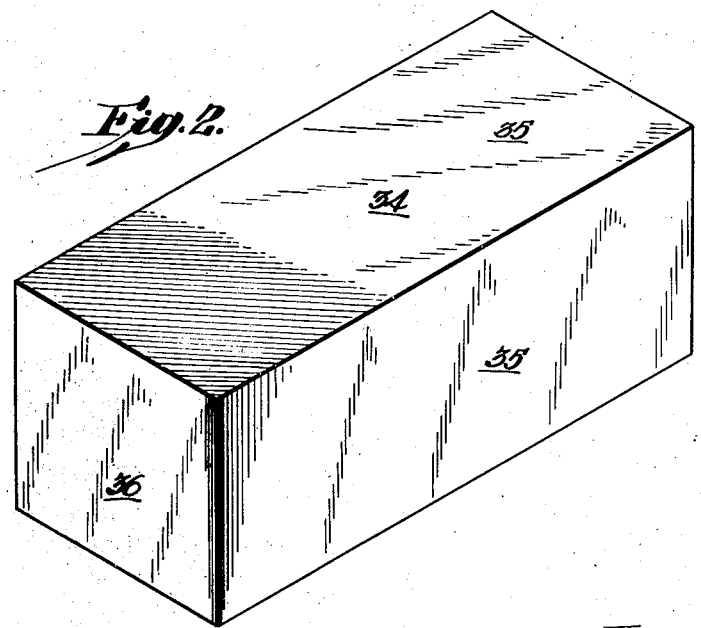
Figure 2 is a perspective view of an open hearth checker brick produced by my invention.

In Figure 2 I illustrate a regenerative checker brick 34, having side walls 35 and end walls 36, produced in accordance with my invention. The use in checkers is the primary use to which I plan to apply my present invention, as my silica brick made from salvaged silica brick removed from a furnace construction is as good as fireclay brick and incomparably cheaper than fireclay or first quality silica brick. Typical checkers, in which brick similar to that of Figure 2 are used, are illustrated at 26 and 27 in Figure 1. I have also illustrated the brick of my invention at 22, 28, 18, 29, 23 and 30 in the walls of the checker chamber, at 20 and 21 in the checker arches, at 19 in the exit flues and at 16 in the backing up of the furnace side walls. The quantities of impurities, such as dust, slag or old binder, inevitably present in salvaged silica brick, and to some extent carried from them into my new silica brick made from the salvaged material will, in the uses just described, make little or no difference, as very high refractoriness and very high load-carrying properties are not necessary in these places.

The main starting material employed is salvaged silica brick resulting from tearing down a metallurgical furnace. This material has once been first quality material, and differs radically from "waste" material, such as "bats" or "culls", produced in the brickyard, which is defective in quality, possibly due to excessive impurities or improper firing. I do not intend to use "waste" silica brick from the brickyard. Efforts have been made to use it for various purposes (U. S. Patents Nos. 895,787; 944,694; 1,221,618; 1,544,433; 1,576,550; 1,587,057; 1,932,202), but, so far as I know, no satisfactory second quality silica brick has been obtained from the "waste" silica material of the brickyard. I will preferably select salvaged silica brick which are reasonably free from slag and dust, and may chip off and reject portions of the brick which are greatly contaminated with slag or dust. Care should be used that the salvaged silica brick employed are really silica brick, and that no fireclay, magnesia or chrome brick salvaged from the furnace are mixed with the salvaged silica brick. I anticipate no difficulty in obtaining an ample supply of salvaged silica brick from the roofs, side walls, etc., of open hearth steel furnaces and the walls and roofs of coke ovens.

The salvaged silica brick will first be ground under conditions which will produce larger and smaller particles, desirably grinding intermediate-sized particles to smaller size. In order to obtain proper density, the intermediate-sized particles should not be in excess of 20%, and should preferably be eliminated from the mix. The ground material is graded according to size into larger particles between 6 and 30 mesh per linear inch (5.6 and 139 mesh per square centimeter) and smaller particles capable of passing through 50 mesh per linear inch (387 mesh per square centimeter). Of the larger particles I use between 40% and 65%, and of the smaller particles I employ between 60% and 35%. The most desirable combination is 55% of larger particles and 45% of smaller particles.

It should be noted that salvaged silica brick is distinctly preferable to raw quartz as a material for use in my brick, because, by reason of the high temperature to which the salvaged silica brick has been subjected in manufacture and during its furnace use, it is to a considerable extent transformed from quartz into cristobalite and/or tridymite and not greatly subject to abnormal volume changes as described in my Patents Nos. 1,969,750 and 1,969,751, to which reference is made for further information on this subject. Heating of the new silica brick is therefore less likely to cause substantial growth which will disrupt the interfitting of the particles and cause disintegration of the brick than where raw quartz is employed. It will in some cases be too costly to employ calcined silica prepared in accordance with the disclosure of my said patents to replace part of the salvaged silica from a furnace construction, but in other cases this may be done, at moderate expense, using not more than 40% of calcined silica in the form of either larger or smaller or both larger and smaller particles, the balance (60%) being salvaged silica.

The calcining should be carried to a temperature above 1400° C., as explained in detail in my Patents Nos. 1,969,750 and 1,969,751, and continued until the particles are volume stable. The calcined silica particles which I may use have a specific gravity less than 2.38 at 0° C. and a total porosity at room temperature of less than 18% and preferably less than 14%.

Not more than 25% of raw quartz in the form of finely ground ganister or pure silica sand preferably of suitable size to make smaller particles, may be used in the brick mix, although a substantial loss in quality results if too much raw quartz is used due to the growth of the raw quartz when the finished brick are subjected to firing temperature in the furnace in which they are used.

Whether the refractory material be entirely ground salvaged silica brick from a furnace construction, or whether it include up to 40% of calcined silica or up to 25% of raw quartz, the suitably sized refractory will be moistened with water and mixed with sodium silicate solution to serve as a bond. I will in any case use not more than enough sodium silicate to introduce 1.5% of sodium oxide (Na₂O) into the finished brick, and by decided preference will keep the sodium oxide (Na₂O) in the finished brick down to 0.5%.

For adequate bonding, the content of sodium silicate should be sufficient to introduce at least 0.1% sodium oxide (Na₂O) into the dried brick, unless a supplemental bond is to be employed. It is best to designate the sodium silicate content by the sodium oxide (Na₂O) in the finished brick because many different compositions of greater or less chemical stability are sold as sodium silicate and the critical item is the sodium oxide, which, if present in too large quantity, seriously reduces the refractoriness of the brick. For example, the ratio of Na₂O to SiO₂ in one commercial sodium silicate is 1:4; in another 1:2.4, etc. The quantity of silica is not a serious factor, as it merely supplements the silica of the brick particles themselves, and the water is driven off during drying of the brick.

The sodium silica may be added to the mix in water solution, it may be added dry to the moistened mix, or it may be added dry to the mix which is subsequently to be moistened.

A typical composition of sodium silicate solution which I have found desirable as a binder is the following:

| | Percent |
|---|---|
| Na₂O | 13.7 |
| SiO₂ | 32.9 |
| H₂O | 53.4 |
| | 100.0 |

Of course the quantity of water in the solution may vary and the percentage of sodium oxide and sodium silicate may vary, but I have produced a satisfactory product using about 3% or 4% of the weight of the moistened mix as sodium silicate solution for binding purposes (water is included in the 3% or 4%, and the total moistened mix includes the water).

In addition to the sodium silicate bond, auxiliary bonds may be used up to 5% of the dry brick. For substantial effect from the auxiliary bond, at least 1% of auxiliary bond, based on the dry brick, should be used. Silicious bond clay may be employed as an auxiliary bond, or finely divided oxide iron ore, or a mixture of silicious bond clay and oxide iron ore. It will be understood, however, that the more auxiliary bond is used, the less desirable is the brick. A typical brick mix which I find satisfactory is the following:

| | Percent |
|---|---|
| Sized particles from salvaged silica brick | 94 |
| Silicious bond clay | 2 |
| Sodium silicate solution as described above | 4 |
| | 100 |

The brick mix is molded under high pressure. The pressure in any case should exceed 1000 pounds per square inch (70.3 kilograms per square centimeter), and 5,000 to 10,000 pounds per square inch (351.5 to 703 kilograms per square centimeter) is a very desirable pressure. I have obtained highly satisfactory results using a molding pressure of 7,500 pounds per square inch (527 kilograms per square centimeter).

The suitably formed brick made as described above are dried to remove substantially all the moisture. I find that 100° C. is a satisfactory drying temperature, and that the bricks should be dried for at least twenty-four hours. The unburned brick produced in the manner described is a highly desirable second quality silica brick, and compares not unfavorably with the first quality silica brick made before the silica brick produced according to Patents Nos. 1,969,750 and 1,969,751 was available in the art.

I am not the first to attempt the manufacture of silica products from salvaged silica brick (British Patents Nos. 123,116 and 196,021; French Patent No. 507,265), but so far as I know no satisfactory brick has been produced from this material, and no brick of this type is available on the market.

Wherever I refer herein to percentages, I mean percentages by weight, except in the case of porosity, which is of course expressed as percentage by volume. Specific gravities, volume weights and porosities referred to herein are based upon measurements at 0° C., unless otherwise stated.

I have not attempted to deduct the percentage of bond from the percentages of salvaged silica, raw quartz or calcined silica stated, and it will be evident that the percentage of bond, being a small item, may be deducted from the larger percentage of salvaged silica, where necessary to make the mix total to 100%, or from the percentage of raw or calcined silica.

It will be evident that the fact that the salvaged silica brick has been subjected to high temperatures for long periods during its previous furnace use makes it of much greater volume stability than raw quartz, which has never been heat treated.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. The process of making silica refractory brick of second quality for use in regenerative checkers and the like, which consists in grinding salvaged silica refractory material previously used as first quality material in a furnace construction, in grading the ground material into larger particles retained on a 30 mesh per linear inch screen, intermediate particles and smaller particles, in mixing larger particles and smaller particles with not more than a relatively small proportion of intermediate particles and with a binder, in molding the moistened mix into brick under pressure exceeding 1000 pounds per square inch and in drying the brick.

2. In the art of manufacturing silica refractory brick, the process which consists in grinding salvaged silica refractory material previously used in a furnace construction, in grading the ground material into larger particles between 6 and 30 mesh per linear inch and smaller particles below 50 mesh per linear inch, in mixing between 40% and 65% of larger particles and between 60% and 35% of smaller particles with water and with a quantity of sodium silicate which will introduce more than 0.1% and less than 1.5% of sodium oxide ($Na_2O$) into the dried brick, in molding the moistened mix into brick under pressure exceeding 1000 pounds per square inch and in drying the brick, whereby a silica refractory brick is produced which is usable in unfired condition for second quality service such as in checkers.

3. In the art of manufacturing silica refractory brick, the process which consists in grinding salvaged silica refractory material previously used in a furnace construction, in grading the ground material into larger particles between 6 and 30 mesh per linear inch and smaller particles below 50 mesh per linear inch, in mixing about 55% of larger particles and about 45% of smaller particles with water and a quantity of sodium silicate which will introduce about 0.5% of sodium oxide ($Na_2O$) into the dried brick, in molding the moistened mix into brick under pressure exceeding 5000 pounds per square inch and in drying the brick, whereby a silica refractory brick is produced which is usable in unfired condition for second quality service such as in checkers.

4. In the art of manufacturing silica refractory brick, the process which consists in grinding salvaged silica refractory material previously used in a furnace construction, in adding not more than 25% of raw quartz particles to the salvaged silica material, in grading the salvaged silica material and the raw quartz into larger particles between 6 and 30 mesh per linear inch and smaller particles below 50 mesh per linear inch, in mixing between 40% and 65% of larger particles and between 60% and 35% of smaller particles with water and with a quantity of sodium silicate which will introduce more than 0.1% and less than 1.5% of sodium oxide ($Na_2O$) into the dried brick, in molding the moistened mix into brick under pressure exceeding 1000 pounds per square inch and in drying the brick, whereby a silica refractory brick is produced which is usable in unfired condition for second quality service such as in checkers.

5. In the art of manufacturing silica refractory brick, the process which consists in grinding salvaged silica refractory material previously used in a furnace construction, in adding not more than 40% of calcined silica particles to the salvaged silica material, in grading the salvaged silica material and the calcined silica into larger particles between 6 and 30 mesh per linear inch and smaller particles below 50 mesh per linear inch, in mixing between 40% and 65% of larger particles and between 60% and 35% of smaller particles with water and a quantity of sodium silicate which will introduce more than 0.1% and less than 1.5% of sodium oxide ($Na_2O$) into the dried brick, in molding the moistened mix into brick under pressure exceeding 1000 pounds per square inch and in drying the brick, whereby a silica refractory brick is produced which is usable in unfired condition for second quality service such as in checkers.

6. In the art of manufacturing silica refractory brick, the process which consists in grinding salvaged silica refractory material previously used in a furnace construction, in grading the ground material into larger particles between 6 and 30 mesh per linear inch and smaller particles below 50 mesh per linear inch, in mixing between 40% and 65% of larger particles and between 60% and 35% of smaller particles with water and with a quantity of sodium silicate which will introduce more than 0.1% and less than 1.5% of sodium oxide ($Na_2O$) into the dried brick and with a substantial amount, less than 5%, of silicious bond clay, in molding the moistened mix into brick under pressure exceeding 1000 pounds per square inch and in drying the brick, whereby a silica refractory brick is produced which is usable in unfired condition for second quality service such as in checkers.

7. In the art of manufacturing silica refractory brick, the process which consists in grinding salvaged silica refractory material previously used in a furnace construction, in grading the ground material into larger particles between 6 and 30 mesh per linear inch and smaller particles below 50 mesh per linear inch, in mixing between 40% and 65% of larger particles and between 60% and 35% of smaller particles with water and with a quantity of sodium silicate which will introduce more than 0.1% and less than 1.5% of sodium oxide ($Na_2O$) into the dried brick and with a substantial amount, less than 5%, of oxide iron ore, in molding the moistened mix into brick under pressure exceeding 1000 pounds per square inch and in drying the brick, whereby a silica refractory brick is produced which is usable in unfired condition for second quality service such as in checkers.

8. A silica refractory brick of second quality, suitable for use in regenerator checkers and the like, in dried, unfired condition, having a cold crushing strength in excess of 1000 pounds per square inch and comprising at least 60% of salvaged silica material previously used in a furnace construction and containing larger silica particles and smaller silica particles with not more than a relatively small proportion of intermediate silica particles, densely compacted together, and a binder.

9. A silica refractory brick in dried, unfired condition, comprising at least 75% of salvaged silica material previously used in a furnace construction and containing between 40% and 65% of larger silica particles between 6 and 30 mesh per linear inch, between 60% and 35% of smaller silica particles below 50 mesh per linear inch, densely compacted together, and sodium silicate in quantity such that the dried brick contains more than 0.1% and less than 1.5% of sodium oxide ($Na_2O$).

10. A silica refractory brick in dried, unfired condition, comprising at least 75% of salvaged silica material previously used in a furnace construction and containing between 40% and 65% of larger silica particles between 6 and 30 mesh per linear inch, between 60% and 35% of smaller silica particles below 50 mesh per linear inch, densely compacted together, and sodium silicate in quantity such that the brick contains about 0.5% of sodium oxide ($Na_2O$).

11. A silica refractory brick in dried unfired condition comprising at least 75% of salvaged silica material previously used in a furnace construction and not more than 25% of raw quartz and containing between 40% and 65% of larger silica particles between 6 and 30 mesh per linear inch, between 60% and 35% of smaller silica particles below 50 mesh per linear inch, densely compacted together, and sodium silicate in quantity such that the brick contains more than 0.1% and less than 1.5% of sodium oxide ($Na_2O$).

12. A silica refractory brick in dried unfired condition comprising at least 60% of salvaged silica material previously used in a furnace construction and not more than 40% of calcined silica and containing between 40% and 65% of larger silica particles between 6 and 30 mesh per linear inch, between 60% and 35% of smaller silica particles below 50 mesh per linear inch, densely compacted together, and sodium silicate in quantity such that the brick contains more than 0.1% and less than 1.5% of sodium oxide ($Na_2O$).

13. A silica refractory brick in dried unfired condition comprising salvaged silica material previously used in a furnace construction, sodium silicate binder and a substantial amount, less than 5%, of silicious bond clay, and containing between 40% and 65% of larger silica particles between 6 and 30 mesh per linear inch and between 60% and 35% of smaller silica particles below 50 mesh per linear inch.

14. A silica refractory brick in dried unfired condition comprising salvaged silica material previously used in a furnace construction, sodium silicate binder and a substantial amount, less than 5%, of oxide iron ore, and containing between 40% and 65% of larger silica particles between 6 and 30 mesh per linear inch and between 60% and 35% of smaller silica particles below 50 mesh per linear inch.

15. A regenerator checker brick in dried unfired condition, having a bulk density of at least 0.95 ounce per cubic inch and comprising a binder and a densely compacted mass of particles containing at least 60% of salvaged material from silica brick previously used in a furnace construction.

RUSSELL PEARCE HEUER.